(12) United States Patent
Muramatsu et al.

(10) Patent No.: US 7,484,606 B2
(45) Date of Patent: Feb. 3, 2009

(54) ONE-WAY CLUTCH AND SPRAG FOR THE ONE-WAY CLUTCH

(75) Inventors: Kazuhiko Muramatsu, Fukuroi (JP); Akira Iwano, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 240 days.

(21) Appl. No.: 11/240,490

(22) Filed: Oct. 3, 2005

(65) Prior Publication Data

US 2006/0076205 A1 Apr. 13, 2006

(30) Foreign Application Priority Data

Oct. 4, 2004 (JP) ............................ 2004-291308

(51) Int. Cl.
*F16D 41/07* (2006.01)
(52) U.S. Cl. ............... 192/45.1; 192/41 A; 192/107 T
(58) Field of Classification Search ............ 192/41 A, 192/113.32; 188/82.8
See application file for complete search history.

(56) References Cited

U.S. PATENT DOCUMENTS

| | | | | |
|---|---|---|---|---|
| 1,932,053 A | * | 10/1933 | Swartz | 192/41 R |
| 3,236,345 A | * | 2/1966 | Dietz | 192/45.1 |
| 3,987,682 A | * | 10/1976 | Roantree | 74/117 |

FOREIGN PATENT DOCUMENTS

JP   6-313445   11/1994

* cited by examiner

*Primary Examiner*—Rodney H Bonck
(74) *Attorney, Agent, or Firm*—Miles & Stockbridge P.C.

(57) ABSTRACT

A one-way clutch comprising an inner race and an outer race radially spaced apart from each other and concentrically disposed for rotation relative to each other, and a spray disposed between the inner race and the outer race for transmitting torque is characterized in that the cam surface of the sprag which contacts with the outer peripheral surface of the inner race is formed with a plurality of axially extending grooves.

3 Claims, 3 Drawing Sheets

ONE-WAY CLUTCH AND SPRAG FOR THE ONE-WAY CLUTCH

BACKGROUND OF THE INVENTION

1. Field of the Invention

This invention relates to a one-way clutch for a torque converter used as a part for torque transmission, back stop, etc., in the driving apparatus of,-for example, an automobile, and more particularly to an improvement in a sprag.

2. Related Background Art

Generally, a one-way clutch comprises an inner race and an outer race radially spaced apart from each other and concentrically disposed for rotation relative to each, and a torque transmitting member disposed between the inner race and the outer race for transmitting torque, and the cam surface of a sprag meshes with the raceway surfaces of the inner and outer races to thereby transmit the torque.

In order to form an oil film, it is preferable that the cam surface of the sprag be as smooth as possible, but in order to give predetermined surface roughness to the cam surface, there is a sprag in which as described in Japanese Patent Application Laid-open No. H6-313445, minute unevenness is formed on a meshing surface to improve the forming rate of oil film on the cam surface.

The sprag, however, if the viscosity of lubricating oil becomes high under a very low temperature environment (e.g. −20° C. to −40° C. or lower), does not normally mesh but continuously causes slip when shift is made from idle rotation to meshing, and there may occur the inconvenience that the meshing of a sprag clutch does not function. When as in Japanese Patent Application Laid-open No. H6-313445, minute unevenness is formed on the surface, there is the possibility that lubricating oil of high viscosity collects in the unevenness and becomes oil film to thereby cause continuous slip.

To overcome these problems, it is conceivable to increase a ribbon spring force which applies a load in a meshing direction to the sprag, but an increase in the ribbon spring force may increase the drag during idle rotation, and may cause the aggravation of fuel consumption in a one-way clutch used in an automatic transmission.

SUMMARY OF THE INVENTION

Accordingly, it is the object of the present invention to provide a one-way clutch which eliminates the above-noted problems and is greatly improved in meshing during a low temperature, and a sprag for use in the one-way clutch.

In order to achieve the above object, the one-way clutch of the present invention is a one-way clutch comprising an inner race and an outer race radially spaced apart from each other and concentrically disposed for rotation relative to each other, and a sprag disposed between the inner race and the outer race for transmitting torque, wherein the cam surface of the sprag which contacts with the inner race and the outer race is formed with a plurality of axially extending grooves.

Also, the sprag of the present invention is a sprag used in a one-way clutch comprising an inner race and an outer race radially spaced apart from each other and concentrically disposed for rotation relative to each other, and disposed between the inner race and the outer race for transmitting torque, wherein a cam surface contacting with the outer peripheral surface of the inner race is formed with a plurality of axially extending grooves.

According to the present invention, there is obtained the following effect.

Since the meshing surface of the sprag which is adjacent to the inner race is formed with a plurality of axially extending grooves, a sufficient meshing property can be secured even during a low temperature at which the viscosity of lubricating oil rises. This is because the grooves formed in the cam surface of the sprag eliminates oil film between the sprag and the inner race which has become high in viscosity during the low temperature, during meshing, and the sprag and the inner race achieve metal-to-metal contact and mesh with each other.

DESCRIPTION OF THE PREFERRED EMBODIMENTS

Figure 1:
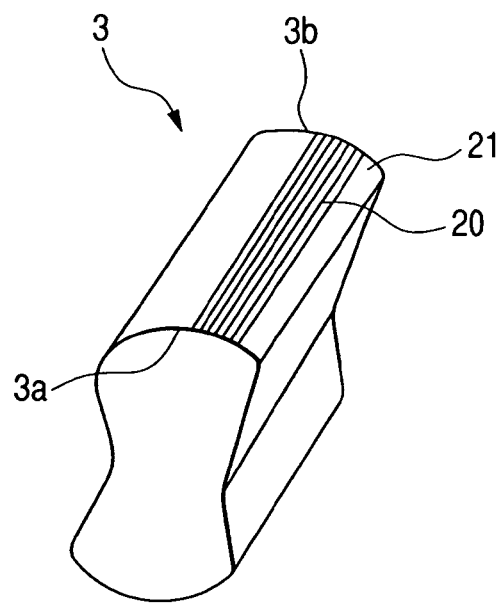
FIG. 1 is a perspective view of a sprag used in a one-way clutch according to an embodiment of the present invention.

The present invention will hereinafter be described in detail with reference to the drawings. The embodiment hereinafter described illustrates the present invention by way of example, and of course does not restrict the present invention. Also, throughout the drawings, like portions are designated by like reference characters.

Figure 2:
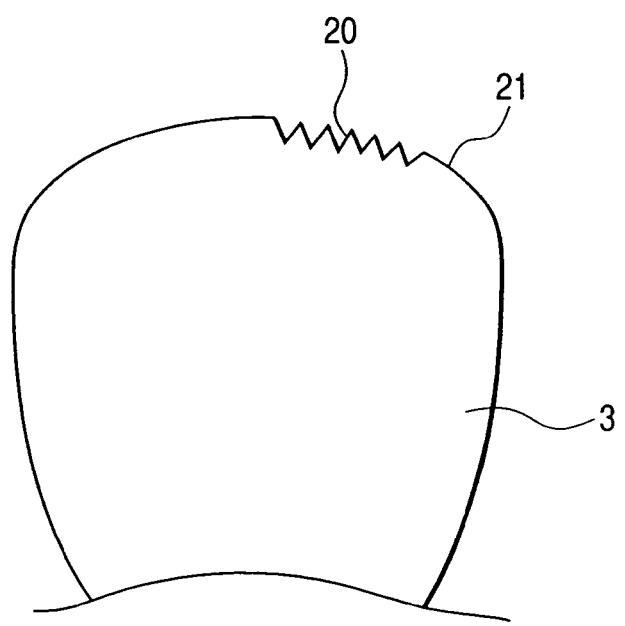
FIG. 2 is a fragmentary front view of the sprag of FIG. 1.

FIG. 1 is a perspective view of a sprag 3 used in a one-way clutch 10 (FIG. 3) according to an embodiment of the present invention, and FIG. 2 is a fragmentary front view of the sprag 3 of FIG. 1. While here is shown an example in which a gourd-shaped sprag 3 is used as a torque transmitting member, the present invention can also of course be applied to a one-way clutch using other form of sprag.

As shown in FIG. 1, the sprag 3 has a plurality of axially extending substantially parallel grooves 20 in a cam surface 21. The grooves 20 extend from one axial edge portion 3a to the other edge portion 3b of the sprag 3. That is, the grooves 20 extend over the entire axial width of the cam surface 21 of the sprag 3.

The depth and pitch of the grooves 20 will now be described with reference to FIG. 2. The depth of the grooves 20 in about 0.005 mm or greater and 0.05 mm or less for the durability of the sprag, but may desirably be within the amount of elastic deformation of the surface during a maximum load, and may more preferably be about 0.015 mm or greater and about 0.03 mm or less.

Also, the pitch between adjacent ones of the grooves 20 can be arbitrarily set, but may desirably be about 0.5 mm or less to secure a meshing property. In FIG. 1, and particularly FIG. 2, for the convenience of illustration, the grooves 20 are depicted at a size larger than the actual size thereof. Also, when the sprag 3 is used in a one-way clutch, the cam surface 21 of the sprag 3 is opposed to the outer peripheral surface of an inner race and therefore, the grooves 20 shown in FIGS. 1 and 2 are located in the lower portion of the sprag 3. That is, in order to show the grooves 20, the sprag 3 is shown as being inverted relative to a state in which it is actually used.

Figure 3:
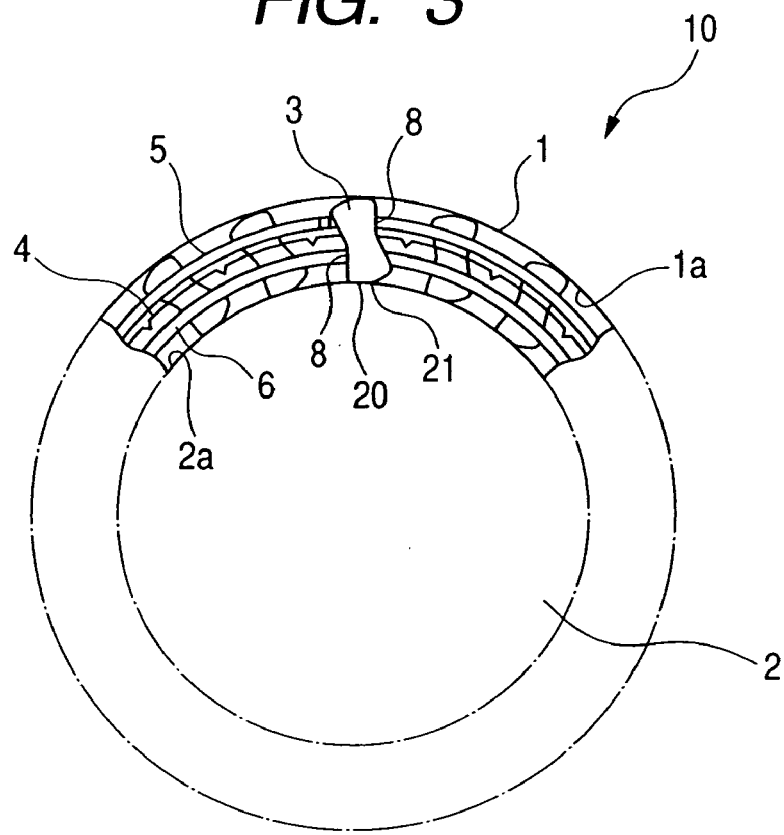
FIG. 3 is a partly broken-away front view of the one-way clutch.

Description will now be made of the construction of a one-way clutch 10 using the sprag 3 formed with the grooves 20 in the cam surface 21. FIG. 3 is a partly broken-away front view of the one-way clutch 10.

In FIG. 3, the one-way clutch 10 is provided with an outer race 1 and an inner race 2. The outer race 1 is provided with a substantially completely round inner peripheral surface 1a. Also, the inner race 2 is provided with a substantially completely round outer peripheral surface 2a. The outer race 1 and the inner race 2 are disposed for rotation relative to each other with the inner peripheral surface 1a and the outer peripheral surface 2a thereof opposed to each other.

In an annular space defined by the outer race 1 and the inner race 2, a plurality of torque transmitting members for transmitting torque between the two races, i.e., ground-shaped sprags 3, are equally arranged in the circumferential direction of the annular space, and transmit the torque between the inner and outer races. The sprags 3 are held in substantially rectangular windows 8 provided in a pair of holders, i.e., an outer holder 5 and an inner holder 6.

A ribbon spring 4 is disposed between the outer and inner holders 5 and 6, and gives the sprags 3 a rising moment in a direction to mesh with an engagement surface. The grooves 20 shown in FIGS. 1 and 2 are formed in the cam surface 21 by which the sprags 3 mesh with the outer peripheral surface 2a of the inner race 2.

It is preferable in terms of cost that the grooves 20 be formed at a time when the sprags 3 are manufactured at the drawing-out step, but the grooves 20 can also be formed after the completion of the sprag 3. Also, the grooves 20 are formed so as to extend over the entire axial width of the cam surface 21 of each sprag 3, whereas they need not always be formed over the entire width, but can also be formed so as not to extend to the axial opposite ends of each sprag 3.

Also, if a desired meshing property is obtained under a very low temperature, the number of the grooves 20 is arbitrary, and is not restricted to the shown number.

While the present invention has been described with respect to a one-way clutch having two holders, i.e., the outer holder and the inner holder, the present invention can also of course be applied to a one-way clutch of a type having a single holder.

Figure 4:
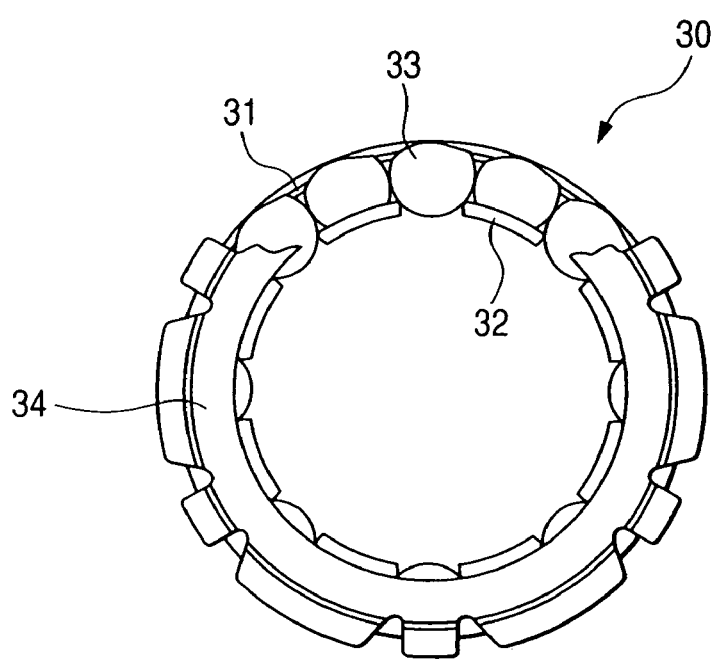
FIG. 4 is a front view of a one-way clutch of other type to which the present invention is applicable.
Figure 5:
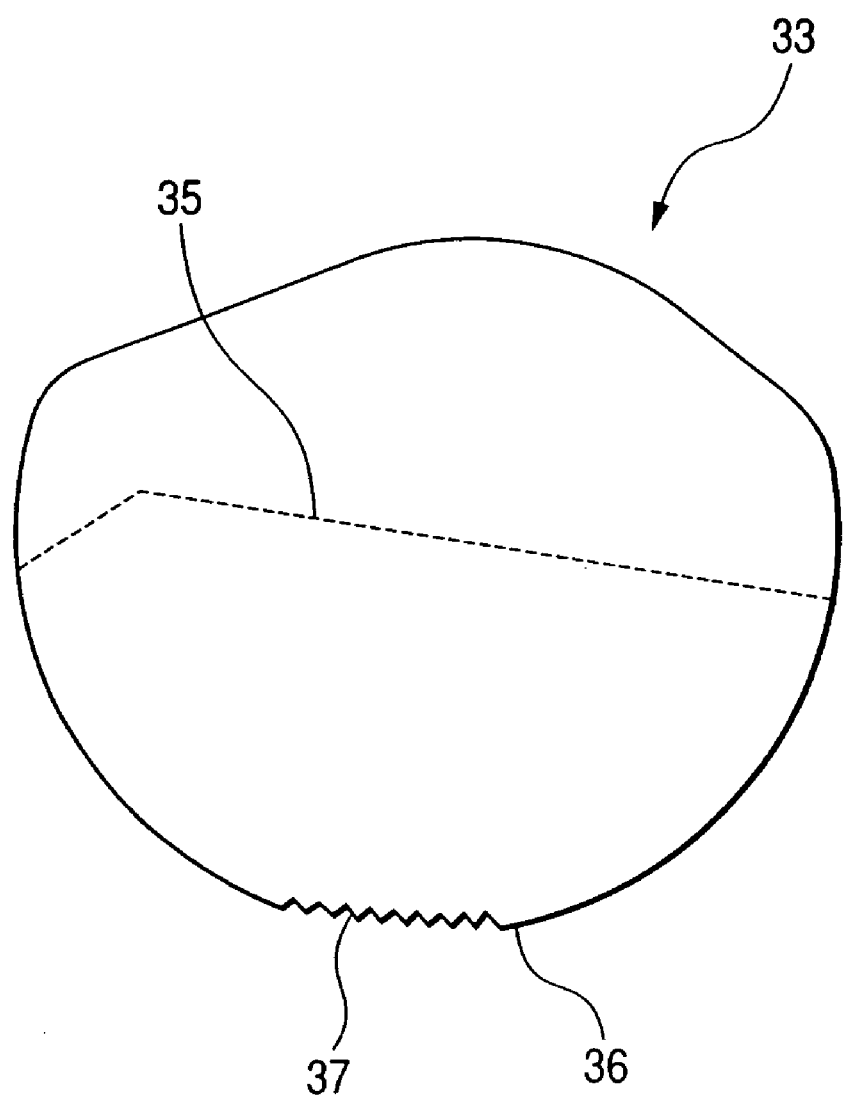
FIG. 5 is a front view of a sprag used in the one-way clutch as shown in FIG. 4.

FIGS. 4 and 5 show a case in which the present invention is applied to a one-way clutch of other type. FIG. 4 is a front view of one-way clutch of other type to which the present invention is applicable and FIG. 5 is a front view of a sprag used in the one-way clutch as shown in FIG. 4. The one-way clutch 30 comprises a sprag 33 provided between inner and outer races to transmit torque, a wire gauge 32 for retaining the sprag 33, a garter spring 31 fitted in a circumferential groove 35 (in FIG. 5) formed in the sprag 33 and a side plate 34 for supporting the sprag 33 in an axial direction. The inner and outer races are not shown.

As shown in FIG. 5, the sprag 33 is provided with a plurality of grooves 37 extending in the axial direction on a cam surface 36 which is in contact with the inner race (not shown). Pitch and depth of the grooves 37 can be designed as in the grooves 20, and the grooves 37 have substantially the same function as the grooves 20.

What is claimed is:

1. A one-way sprag clutch comprising an inner race having an outer peripheral surface and an outer race having an inner peripheral surface radially spaced apart from the outer peripheral surface, said surfaces being concentrically disposed for rotation relative to one another, and a sprag disposed to extend between said surfaces for transmitting torque therebetween, wherein a cam surface of said sprag which contacts with the outer peripheral surface of said inner race is formed with means comprising a plurality of axial grooves extending over the entire axial width of said sprag for eliminating an oil film between said sprag and said inner race, and wherein the depth of said grooves is between about 0.005 mm and about 0.05 mm, and said plurality of grooves are formed axially substantially in parallelism to each other, and the pitch between adjacent ones of said grooves is about 0.5 mm.

2. A one-way sprag clutch according to claim 1, wherein the depth of said grooves is between about 0.015 mm and about 0.03 mm.

3. A one-way sprag clutch according to claim 1, wherein said one-way sprag clutch is adapted to be used at a very low temperature environment of −20° C. or lower.

* * * * *